Patented May 29, 1934

1,960,820

UNITED STATES PATENT OFFICE 1,960,820

ELEVATOR CONTROL SYSTEM

Jacob Daniel Lewis and William Henry Bruns, Yonkers, N. Y., assignors to Otis Elevator Company, New York, N. Y., a corporation of New Jersey Application October 21, 1932, Serial No. 638,842

16 Claims. (Cl. 187—29)

The present invention relates to the control of elevator cars and especially to controlling the car so as to obtain accurate stops.

There are various factors in elevator operation which affect the accuracy of stopping of the car at the landings. Among these are the speed at which the car is travelling, the direction of travel of the car, the position of the car in the hatchway, the load being carried by the car, the retarding force employed and the distance of the car from the landing at the time a reduction in speed is initiated. The load carried by the car, the direction of travel of the car and its position in the hatchway are all factors which determine the net load on the hoisting motor. Assuming, for example, a constant retarding force, the amount of speed reduction effected in a certain distance of car travel will be greater when the net load on the hoisting motor is a positive one than when this net load is a negative or overhauling one. In other words, the car speed will be reduced to a certain value in less distance with a positive net load than with a negative one. This is due to the fact that gravity assists in retarding the car when the net load is positive but opposes the retarding of the car when the net load is negative. The speed of the car at the time a reduction in speed is initiated has a similar effect, the car speed being reduced to a certain value in less distance from a lower speed than from a higher one.

The invention is directed to compensating for the effect of factors variably affecting the accuracy of stopping of an elevator car and has for its principal object controlling the point at which a reduction in speed begins by mechanism which anticipates the distance from a landing at which such reduction in speed should start in order to make an accurate stop at the landing.

The invention involves utilization of the inertia of a movable body. In operation, the kinetic energy of the movable body is caused to change and the change in kinetic energy is utilized to control the distance from a landing at which a reduction of speed of the car takes place. The change in kinetic energy is started upon the arrival of the car at a predetermined distance from the landing and the distance from the landing at which the reduction in speed of the car takes place is thereafter determined in accordance with the time required for the kinetic energy of the body to change to a certain value.

In an embodiment of the invention which will be described, kinetic energy is developed in the movable body and thereafter overcome and at the instant the kinetic energy is overcome circuit controlling contacts are caused to operate to initiate a reduction in speed of the elevator car. The operating mechanism for the circuit controlling contacts, of which the movable body forms a part, is controlled in accordance with the net load on the elevator hoisting motor and/or speed of the car to cause the speed reduction to begin with the car at such distance from a landing at which a stop is to be made as to cause an accurate stop to be obtained.

In carrying out the invention, it is preferred to employ motor operated switching mechanism hereinafter termed a compensator, to control the point at which the reduction in the speed of the hoisting motor is to start. There are various ways in which the compensator may be controlled to accomplish the purposes of the invention. One of the preferred arrangements and the one which has been illustrated for purposes of description involves arranging the circuit controlling contacts so that they are operated only when the compensator motor starts to operate in a certain direction but not when the motor operates in the opposite direction. The compensator is started in operation, upon the arrival of the car at a certain fixed distance from the landing at which a stop is to be made, in a direction such as not to cause operation of its circuit controlling contacts. It is thereafter permitted to accelerate until the car arrives at another fixed distance from the landing, and thereupon is caused to slow down. The accelerating torque of the compensator motor and therefore the kinetic energy developed by the rotor thereof is caused to be greater the more the net load on the hoisting motor. This kinetic energy developed is also greater the lower the speed of the car as it travels between these two fixed points, due to the fact that the amount of time in which to accelerate is greater. The retarding torque of the compensator motor is caused to be such as to bring it down to zero speed and effect a reversal thereof in a period of time which is greater the more the net load on the hoisting motor and the lower the speed of the car. This causes the compensator motor to be reversed and the compensator contacts operated to initiate the speed reduction of the elevator car at different distances from the landing and by proper adjustment this distance may be caused to be such as to effect an accurate stop of the car, regardless of the net load on the hoisting motor and the speed at which the car is travelling at the time that the reduction in speed begins.

The embodiment of the invention above referred to will be described in connection with the accompanying drawings, in which:—

The invention is of particular application in a slow speed elevator installation, say of one hundred to one hundred and fifty feet per minute car speed, in which a polyphase alternating current motor is employed to raise and lower the car. In such installation it is usual to slow down and stop the car simply by discontinuing the supply of power to the hoisting motor and applying the electromagnetic brake. Inasmuch as the retarding force is the same for all loads, the amount of coast of the car before it is brought to rest is greatest with full load down and least with full load up. Assuming that the supply of power is discontinued at a fixed distance from the landing, as is the usual practice, for example, in the case of push button control systems, the varying coast of the car may cause the car to come to rest either above or below the landing at which the stop is being made. The invention effectively compensates for such varying coasts of the car and in view of its particular adaptability to installations of this nature and the relative simplicity of control systems for these installations, the invention will be described as applied to an elevator system of this character.

Figure 1:
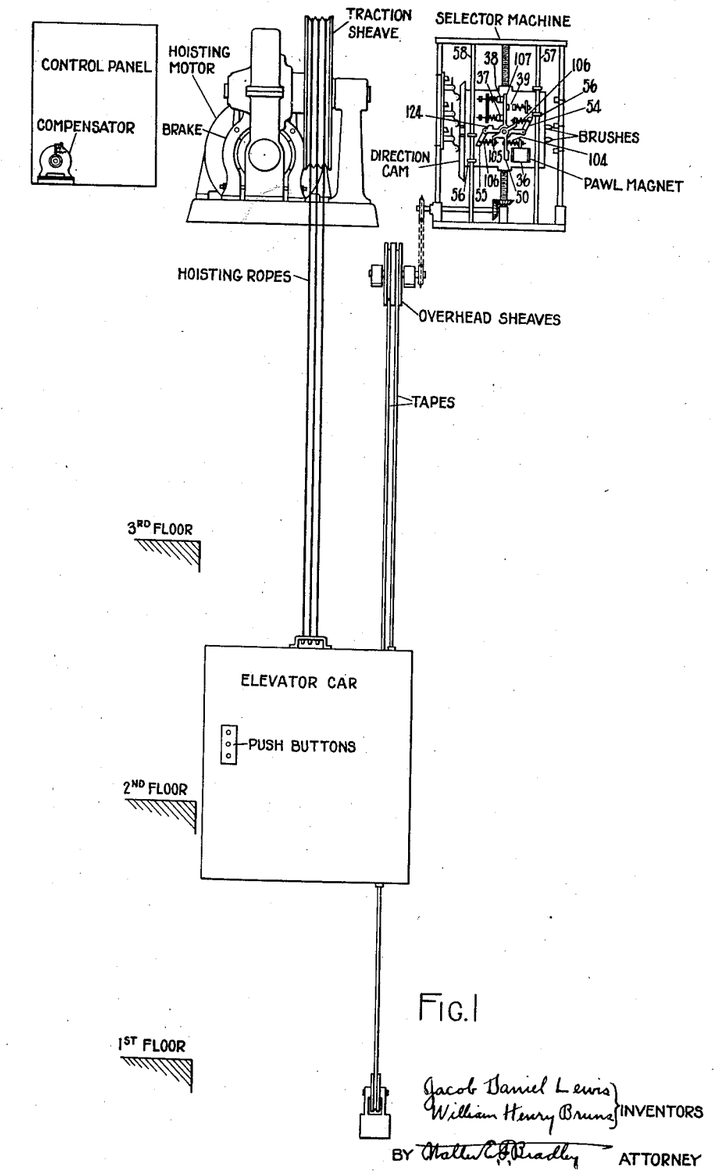
Figure 1 is a schematic representation of an elevator installation illustrating suitable mechanism for use in carrying out the invention.

Referring to Figure 1, wherein the parts of the system are indicated by legend, the hoisting motor for the elevator car drives a traction sheave over which pass the hoisting ropes for the car and counterweight. The electromagnetic brake for the hoisting motor acts on a brake drum driven by the motor shaft. The compensator for controlling the point of discontinuance of the supply of power to the hoisting motor and application of the brake is illustrated as arranged on the control panel provided for the various electromagnetic switches of the control system.

The operation of the compensator is controlled in accordance with the position of the car. A device driven by the car, usually termed a selector machine, has been illustrated for this purpose. The selector machine comprises a travelling nut or crosshead driven by a vertical screw. The screw is caused to rotate by tapes, one attached to the top of the car and the other to the bottom of the car. These tapes are wound on overhead sheaves in a manner similar to that used in winding measuring tapes, one being wound oppositely with respect to the other. These sheaves drive the vertical screw through bevel gears, the driving being effected by the unwinding of one of the tapes as movement of the car takes place, the other tape being wound up during the driving operation.

The crosshead of the selector carries brushes for engaging stationary contacts mounted on an upright extending between the base and top of the machine. Two of these brushes are illustrated, one for up car travel and one for down car travel. These brushes control the deenergizing of the pawl magnet, also carried by the crosshead, this pawl magnet acting in turn to control the acceleration and retardation of the compensator motor. A push button control system will be described, the direction cam carried by the crosshead of the selector machine cooperating with direction switches on another upright of the machine to determine the direction of car travel when a push button has been pressed.

Figure 2:
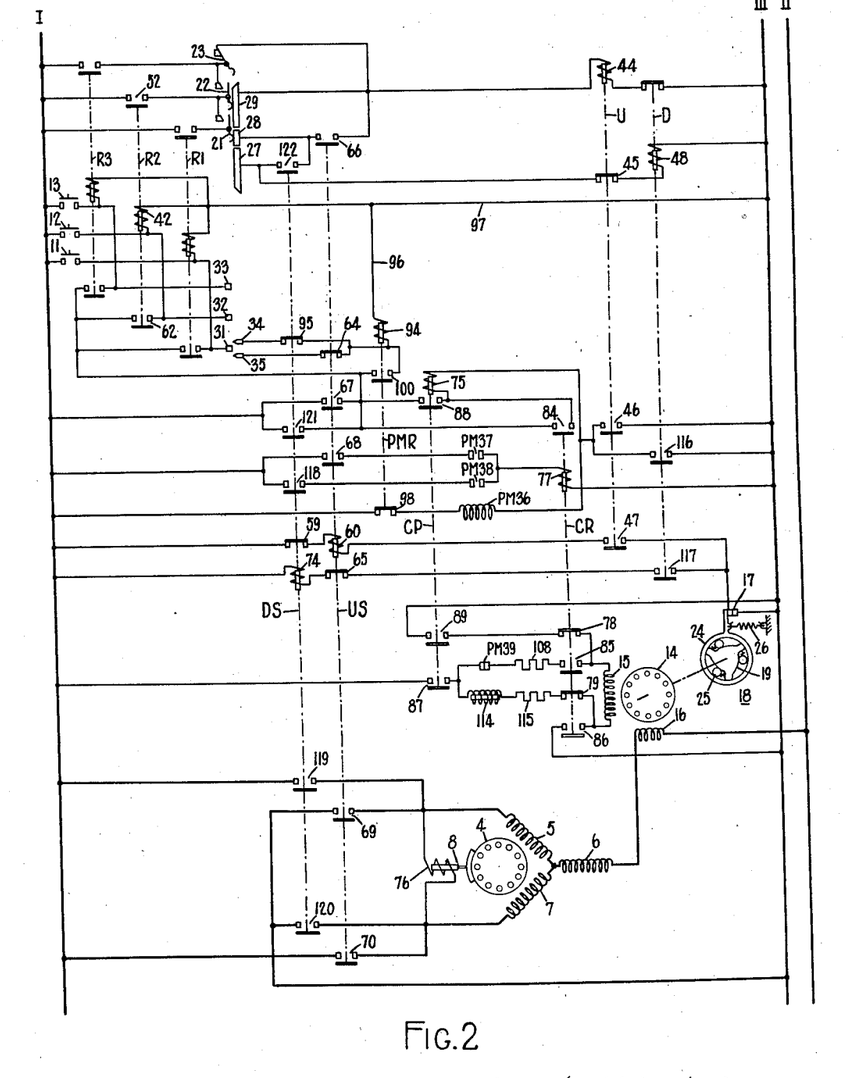
Figure 2 is a simplified wiring diagram of power and control circuits employed to illustrate the operation of the invention.

Referring to Figure 2, no attempt is made in the push button controlled elevator wiring diagram therein illustrated to show a complete system. Only such parts of the system are shown as are considered desirable in order to explain the principles of the invention. Door and gate contacts, safety and protective switches and the like as well as certain other parts of the system have been omitted. Also, the parts of the switches shown may not be in the preferred points in the circuits, certain changes being made in order to make the type of wiring diagram employed as simple as possible. This diagram is a modified form of "straight" in which the operating connections between the contacts of switches and their operating magnets are indicated by dot and dash lines. The parts of the selector machine are separated in the interest of simplicity, the relation of these parts being schematically shown in Figure 1.

The circuits for only a three floor installation are illustrated. Each of the push buttons and other parts of the system corresponding thereto as to floor is designated by a reference character containing as its right hand numeral one of the numbers 1, 2 or 3, according to the floor for which the part is provided. Also only the push buttons in the car are illustrated. The car buttons, designated as to floors as 11, 12 and 13, act through floor relays to control the starting of the car. These floor relays are designated as to floors as R1, R2 and R3. The floor relays, in turn, act through either the up relay U or down relay D to cause the stator windings of the hoisting motor to be connected to the alternating current supply mains I, II and III.

The hoisting motor is illustrated as of the squirrel cage iduction type, the rotor being designated 4 and the stator windings 5, 6 and 7. For simplicity, the electromagnetic brake 8 is shown schematically and as applying to the hoisting motor rotor. The circuits are illustrated for connecting the stator windings directly to the supply mains but it is to be understood that suitable means are provided for initially reducing the value of the voltage applied to these windings.

The compensator motor is illustrated as a two phase motor of the squirrel cage induction type. The rotor of this motor is designated 14 while the stator windings are designated 15 and 16. The rotor operates the compensator contacts 17 through the intermediary of a slip clutch, designated 18. This clutch is illustrated schematically as of the ball and cam type with the cam 19 arranged to run freely within the contact operating portion 24 during clockwise rotation but to grip the portion 24 through the agency of balls 25 to effect the separation of contacts 17 against the force of spring 26 upon reverse rotative movement of the rotor. The contacts 17 are arranged in the circuits so as to cause, upon their separation, the disconnection of the hoisting motor from the supply mains and the application of the brake to slow down and stop the car.

The direction cam of the selector machine is shown as made up of three contacting sections, designated 27, 28 and 29. The selector direction switches which are engaged by this cam are designated as to floors as 21, 22 and 23. The up and down selector brushes are designated 34 and 35 respectively. The stationary contacts engaged by these brushes are designated as to floors as 31, 32 and 33. The selector pawl magnet is designated generally as PM, its coil being designated PM36 and its contacts PM37, PM38 and PM39.

The electromagnetic switches in addition to up relay U and down relay D are designated as follows:

US—Up direction switch
DS—Down direction switch
PMR—Pawl magnet relay
CR—Compensator reversing switch
CP—Compensator potential switch The system is illustrated for the condition with the car at rest at the first floor. Assume that the second floor push button 12 is pressed. This completes a circuit for the coil 42 of the second floor relay R2, connecting it across supply mains I and III. The second floor relay engages its contacts 52 and 62. Contacts 62 prepare the circuit for selector stationary contact 32 for the second floor. Contacts 52 complete the circuit for the coil 44 of up relay U, this coil being connected across supply mains I and III with the circuit extending through the contact lever of selector second floor direction switch 22 and up direction cam section 29. Up relay U operates to separate its contacts 45 and engage contacts 46 and 47.

Contacts 45 are direction interlock contacts arranged in the circuit for the coil 48 of down relay D. Contacts 46 complete the circuit for pawl magnet coil PM36. Referring back to Figure 1, in which the designating letters PM are not applied, the energization of the pawl magnet attracts armature 50, moving it counterclockwise about its pivot shaft. This armature acts through links to retract the up pawl 54 and the down pawl 55 into positions where they clear collars 56 during travel of the car. These collars are arranged in spaced relation on uprights 57 and 58 of the selector machine. At the same time, as will be seen from later description, this results in the separation of pawl magnet contacts 39 and the reengagement of pawl magnet contacts 37 and 38. The purpose of the pawl magnet contacts will be seen as the description proceeds.

The engagement of contacts 47 of up relay U completes the circuit for the coil 60 of up direction switch US. This circuit is from supply main I through interlock contacts 59 of the down direction switch DS and compensator contacts 17 to supply main III. The up direction switch, upon operation, separates its contacts 64 and 65 and engages its contacts 66, 67, 68, 69 and 70. Contacts 64 and 65 are direction interlock contacts, the separation of contacts 64 rendering selector down brush 35 ineffective during up car travel and the separation of contacts 65 preventing the energization of coil 74 of down direction switch DS. Contacts 66 connect direction cam up contacting section 29 with intermediate section 28 for a purpose to be explained later. Contacts 67 connect selector second floor stationary contact 32 to supply main I and at the same time prepare a circuit for the coil 75 of compensator potential switch CP.

Contacts 69 and 70 of the up direction switch connect stator phase windings 5 and 7 of the hoisting motor to supply mains III and I respectively, the other stator phase winding 6 being connected to supply main II. The engagement of contacts 69 and 70 also completes the circuit for the release coil 76 of the electromagnetic brake, causing the brake to be released. The stator windings of the hoisting motor being energized and the brake being released, the car is started in the up direction.

The engagement of contacts 68 of up direction switch US connects coil 77 of compensator reversing switch CR to the supply mains I and III, this circuit extending through pawl magnet contacts PM37. The compensator reversing switch thereupon operates to separate its contacts 78 and 79 and engage its contacts 84, 85 and 86. The purpose of contacts 78 and 79 will be explained later. The engagement of contacts 85 and 86 prepares a circuit for stator phase winding 15 of the compensator motor. This circuit cannot be completed at this time, however, owing to the fact that compensator potential switch contacts 87 and pawl magnet contacts PM39 are separated.

The engagement of contacts 84 of the compensator reversing switch completes a circuit for the coil 75 of the compensator potential switch, this circuit extending from supply main I through up direction switch contacts 67 and up relay contacts 46 to supply main III. This causes the operation of the compensator potential switch to engage its contacts 87, 88 and 89. Contacts 88 by-pass contacts 84 of the compensator reversing switch, thereby establishing a self-holding circuit for the compensator potential switch. Contacts 87 and 89 are in the circuits for the stator phase winding 15 of the compensator winding. The engagement of these contacts, however, cannot complete a circuit for this winding at this time, owing to the fact that pawl magnet contacts PM39 and contacts 78 of the compensator reversing switch are separated.

As the car nears the second floor, up selector brush 34 engages second floor stationary contact 32 to complete the circuit for the coil 94 of the pawl magnet relay PMR, this circuit extending from supply main I through contacts 67 of up direction switch US, contacts 62 of second floor relay R2, contacts 95 of down direction switch DS, wire 96 and wire 97, to supply main III. The pawl magnet relay, upon operation, separates its contacts 98 and engages its contacts 100. The engagement of contacts 100 establishes a self-holding circuit for this relay, these contacts by-passing contacts 62 of second floor relay R2, selector brush 34 and stationary contact 32 and contacts 95 of down direction switch DS.

The separation of contacts 98 of the pawl magnet relay deenergizes the pawl magnet coil PM36. Referring back to Figure 1, the deenergization of pawl magnet 36 releases armature 50 which is forced clockwise about its pivot shaft as by spring 104. The armature acts through its integral lever member 105 and springs 106 to extend the pawls 54 and 55 into position for cooperation with the collars 56. The parts of the selector machine have been illustrated for this condition in Figure 1. It is to be noted that at this time up pawl 54 is in position to engage the up second floor collar 56 on upright 57.

As continued upward movement of the car takes place, the selector crosshead moves upwardly, causing the engagement of pawl 54 with the up second floor collar to take place. Further upward movement of the crosshead causes contact lever 107, on the arms of which the pawls are pivoted, to be moved clockwise about the pivot shaft. Upon the arrival of the car at another fixed distance from the second floor, the amount of clockwise movement of contact lever 107 is sufficient to effect the engagement of contacts 39. This completes the circuit for stator phase winding 15 of the compensator motor. This circuit is from supply main I through contacts 87 of the compensator potential switch CP, contacts 85 and 86 of compensator reversing switch CR to supply main III. The circuit contains a certain amount of impedance illustrated as resistance and designated 108.

Stator phase winding 15, being connected across supply mains I and III, is a potential winding. The other stator phase winding 16 of the compensator motor is a current winding, being connected permanently in series with stator phase winding 6 of the hoisting motor. The establishment of the circuit for the potential winding of the compensator motor through contacts 85 and 86 of compensator reversing switch causes clockwise rotative movement of the rotor 14 and consequently of the clutch cam 19. Owing to its counterclockwise rotation, this cam runs freely within the contact operating portion 24 so that no movement of portion 24 takes place.

Upon further upward movement of the selector crosshead, and upon the arrival of the car at another fixed distance from the second floor, the amount of clockwise movement of contact lever 107 is sufficient to effect the separation of pawl magnet contacts 37. This breaks the circuit for coil 77 of the compensator reversing switch, causing the separation of contacts 85 and 86 and the reengagement of contacts 78 and 79. This reverses the connection for potential phase winding 15 of the compensator motor, the circuit being from supply main I through compensator potential switch contacts 87, impedance represented as an inductance 114 and resistance 115, compensator reversing switch contacts 79 and 78 and compensator potential switch contacts 89 to supply main III. This causes the compensator motor to develop a torque for effecting rotation of its rotor 14 in the reverse direction. This results first in the compensator motor being slowed down to a zero speed and then starting in the reverse direction.

As rotor 14 starts to rotate in the reverse direction, cam 19 wedges balls 25 in position to grip contact operating member 24, causing movement of this member in a direction to effect the separation of contacts 17 against the force of spring 26. This causes the deenergization of coil 60 of up direction switch US. As a result, the up direction switch drops out, disconnecting stator phase windings 5 and 7 of the hoisting motor and brake release coil 76 from the supply mains. The brake is then applied to slow down the hoisting motor and finally bring it to rest with the car level with the second floor landing.

The up direction switch, in dropping out, separates contacts 67 to break the holding circuits for the coils 94 and 75 of the pawl magnet relay PMR and compensator potential switch CP respectively. The compensator potential switch, upon dropping out, breaks the circuit for the potential phase winding of the compensator motor. Thus the compensator motor comes to a stop, the current through the current phase winding 16 of the motor being discontinued as a result of breaking the circuit for the hoisting motor stator windings. Upon the compensator motor coming to rest, spring 26 causes contacts 17 to reengage.

Up direction switch contacts 66 act to maintain coil 44 of up relay U energized and therefore up relay contacts 47 in the circuit for up direction switch coil 60 in engagement until after the opening of compensator contacts 17 to disconnect coil 60 of up direction switch US from the supply mains. This prevents the premature dropping out of the up direction switch as the car approaches the landing at which a stop is to be made. Contacts 66, connecting direction cam up contacting section 29 with intermediate section 28, cause the circuit for coil 44 of up relay U through second floor relay contacts 52 to be transferred from the up contacting section to the intermediate section as the car nears the second floor landing. The near ends of the up and down contacting sections 29 and 27 are preferably formed at an angle to the vertical as viewed from the front of the cams, and the adjacent edges of the intermediate section are angled to correspond. This insures the engagement of the contacting end of each contact lever with the intermediate cam section before it leaves the end cam section. Thus, coil 44 of up relay U is maintained energized until contacts 66 of up direction switch US separate as a result of the separation of compensator contacts 17. Up relay U, upon dropping out, separates its contacts 46, preventing the energization of the pawl magnet as a result of the reengagement of contacts 98 of the pawl magnet relay.

Operation of the car for down car travel is the same as that described for up car travel. Assume, for example, that the car is at the third floor at the time the second floor button 12 is pressed. Under such conditions, down contacting section 27 of the direction cam is in position engaging the contact lever of second floor direction switch 22 so that the circuit established by contacts 52 of second floor relay R2 is for the coil 48 of down relay D. This relay engages its contacts 116 to effect the energization of pawl magnet coil PM36 and its contacts 117 to complete the circuit for coil 74 of down direction switch DS. The down direction switch completes the circuit for the brake release coil and for the stator windings of the hoisting motor to start the car in the down direction, its contacts 119 connecting phase winding 5 to supply main I and its contacts 120 connecting phase winding 7 to supply main III. Contacts 118 of the down direction switch complete the circuit for coil 77 for the compensator reversing switch. Contacts 121 of the down direction switch prepare the circuit for the coil of the compensator potential switch and connect selector stationary contact 32 to supply main I. Contacts 122 of the down direction switch connect down contacting section 27 of the contacting cam to intermediate section 28 while contacts 95 of the down direction switch separate to render up selector brush 34 ineffective during down car travel.

The pawl magnet relay coil 94 is energized upon the arrival of the car at a certain distance from the second floor by the engagement of down selector brush 35 with stationary contact 32. The deenergization of the pawl magnet coil PM36 as a result of the separation of contacts 98 of the pawl magnet relay causes the pawls to be extended for cooperation with the collars 56. At this time, the down pawl 55 is above the down second floor (upper) collar 56 on upright 58. The engagement of down pawl 55 with this collar causes, as the car continues its downward movement, the sequential closing of pawl magnet contacts 39 and opening of pawl magnet contacts 38 at fixed distances from the second floor to accelerate and retard the compensator motor as described for stopping the car in the up direction.

The separation of compensator contacts 17 as the rotor of the compensator motor starts in the reverse direction breaks the circuit for coil 74 of down direction switch DS, causing the hoisting motor stator windings to be disconnected from the supply mains and the brake to be applied to slow down the car and finally bring it to a stop. In this connection, it is preferred to employ two sets of pawl magnet contacts, namely 37 and 38, to control the deenergization of the coil 77 of the compensator reversing switch CR for purposes of obtaining different adjustments for up and down travel if desired. However, one set of pawl magnet contacts may be employed for this purpose instead of two.

When the car is stopped at a floor, the pawl which effected the movement of the pawl contacts operating lever 107 remains in engagement with the collar. Also, the parts are preferably arranged so that the other pawl slides over its collar into cooperating position as the car comes to rest at the floor. The maintenance of this cooperating relationship between the pawls and the collars keeps pawl contacts 39 in engagement and pawl contacts 37 and 38 separated while the car is at rest at a floor. The attraction of armature 50 upon energization of the pawl magnet in the starting operation causes the pawls to be retracted and thus released from the collars. This releases the contact lever 107 which is returned, as by weight 124 formed on one of the arms of the lever, into position separating contacts 39 and reengaging contacts 37 and 38.

The amount of speed developed by the compensator motor in the control arrangement illustrated depends upon the net load on the hoisting motor and the speed of the elevator car. The current phase winding 16 of the compensator motor, being in series with phase winding 6 of the hoisting motor, produces a flux for accelerating the compensator motor which increases with the load on the hoisting motor. The flux produced by the potential phase winding 15 for accelerating the compensator motor being constant, the torque developed by the compensator motor and therefore the speed of the motor becomes greater with increased net load on the hoisting motor. The speed developed by the compensator motor also increases with lower car speeds, owing to the fact that the lower the speed of the car, the greater the time which elapses between the engagement of pawl magnet contacts PM39 and the separation of pawl magnet contacts PM37 or PM38 and therefore the more time provided for the compensator motor to accelerate. Thus, the amount of kinetic energy developed by the compensator motor becomes greater, the greater the net load on the hoisting motor and the less the speed of the car as it travels between the fixed distances determined by the setting of the pawl magnet contacts.

The phase of the current passing through current winding 16 of the compensator motor changes considerably with different net loads on the hoisting motor. To insure the development of a torque to cause clockwise rotative movement of the compensator motor, it is preferred to adjust the phase of the current passing through potential winding 15 so as to cause the torque developed to be in the same direction, regardless of the load on the hoisting motor. This adjustment may be obtained by means of impedance in the circuit of potential winding 15, for example, in the circuits illustrated by the proper ohmic value of resistance 108. Likewise, to insure the speed which the compensator motor attains during the accelerating period being in some proportion to the load and speed of the elevator car, the mass of the rotating parts, the torque developed by the motor and the duration of the accelerating period are so correlated as to prevent the motor exceeding a speed somewhat less than synchronous speed under any condition of load in the elevator car. Furthermore, the compensator motor is so designed that its torque is substantially constant for each load up to the speed developed by the motor for that load. With any given installation, the excitation of the potential winding may be adjusted, as by varying resistance 108, so that the desired torque is developed, and the duration of the accelerating period may be varied as by varying the points at which contacts PM39 and PM37 or PM38 on the selector machine operate with respect to each other.

The retarding torque developed by the compensator motor, after the reversal of the connections for the potential winding 16, is caused to be such as to effect reversal in a period of time which is greater, the more the load on the hoisting motor and the less the speed of the car. That is the time required to reverse the compensator motor from the relatively high speed attained for example under maximum positive load conditions is caused to be more than the time required to reverse the motor from the relatively low speed attained for example under negative load conditions. This variation in time permits the car to travel varying distances after the separation of contacts PM38 or PM37, thus causing the discontinuance of the supply of power to the hoisting motor and application of the brake to take place at different distances from the landing at which a stop is to be made, this distance being greater in case of negative loads and high car speeds than in case of positive loads and low car speeds. By proper adjustments, these distances may be caused to be such as to bring the car to an exact stop at the landing. The adjustment for retardation of the compensator motor may be obtained by means of impedance in the circuit of the potential winding 15, for example, in the circuits illustrated, by the proper amount of inductance 114 and resistance 115, this adjustment, together with adjustments to obtain the proper accelerating distance and point at which retardation of the compensator motor begins, insuring accurate stops, regardless of load and speed conditions.

Summarizing the operation of the embodiment above described:

1. Upon the arrival of the car at a fixed distance from a landing at which a stop is to be made, which distance is greater than the maximum distance required to slow down and stop the car, an auxiliary motor is started in operation.

2. The auxiliary motor is thereupon accelerated until the car arrives at a second fixed distance from the landing, its accelerating torque being in accordance with the load on the hoisting motor.

3. Upon the arrival of the car at this second fixed distance from the landing, retardation of the auxiliary motor is started. The auxiliary motor is then slowed down to zero speed and reversed in a length of time which is proportional to the load on the hoisting motor.

4. As this reversal takes place, slow down of the elevator car, which has been travelling at full speed up to this time, is initiated and the brake applied to bring the car to a stop at the landing level.

It is to be understood that various changes may be made in the particular arrangement shown and specifically described, including the manner of connecting the potential phase winding of the compensator motor and the manner of making the adjustments. Although the invention has been described as applied to a three phase alternating current elevator installation, it is appilcable to installations of other numbers of phases. It is also applicable to direct current installations, as for example by employing, as a compensator motor, a shunt motor having both a potential field winding, i. e., one supplied with current by a constant voltage, and a current field winding, i. e., one supplied with current proportional to that passing through the hoisting motor armature. Also the mechanism for controlling the operation of the compensator motor may be varied, for example, by employing other types of mechanism driven by the car or the hoisting motor or by arranging cooperating mechanism on the car and in the hatchway.

In addition, the manner of operation of the compensator may be varied. For example, instead of causing the kinetic energy developed thereby during the accelerating period to vary with different load and speed conditions, the kinetic energy may be caused to always be the same and the retarding torque developed caused to be such as to effect reversal in such time that the distance travelled by the car during this time plus the distance required to bring the car to a stop is a constant, regardless of load and speed. Such arrangement permits bringing the compensator motor up to full speed for each operation, thereby permitting acceleration of the compensator motor to take place at any time after the last stop of the car, provided the motor reaches full speed by the time that the car reaches the point at which retardation of the compensator motor begins.

Also, the compensator motor may always be brought up to the same speed with a torque which varies inversely as the net load on the hoisting motor and directly as the speed of the car. Accurate stops with this arrangement may be obtained by starting the compensator motor in operation at a suitable fixed distance from the landing and causing the reduction in speed of the elevator car to begin at the instant the compensator motor attains a predetermined fixed speed.

Still other arrangements may be employed which utilize the kinetic energy of a movable body to control the point at which a reduction in speed of the elevator car begins and all such arrangements are within the scope of the invention.

A slow speed installation has been chosen to illustrate the principles of the invention and, although the invention is particularly applicable to such installations, it is also applicable to higher speed installations in which the compensator may be employed to cause a reduction of speed to take place. Also, although a push button controlled system has been described, it is to be understood that the invention is applicable to systems controlled in other ways, such as those in which the starting of the car is under the control of an attendant in the car with slow down controlled by passengers and intending passengers themselves or those in which both starting and slow down are under the control of a car attendant, with the slow down initiated automatically after movement of the control switch in the car to a certain position. Also, certain embodiments of the invention, such as those in which the control of the compensator is effected at only one fixed distance from the landing, are applicable to installations in which both starting and slow down are controlled directly by the car attendant, as this involves no more skill on the part of the attendant than being able to center his control switch at the same distance from each landing at which a stop is to be made.

Thus it is apparent that many changes could be made in the arrangement and control of the compensator and that many apparently widely different embodiments of the invention could be made without departing from the scope thereof and it is therefore intended that all matter contained in the above description or shown in the accompanying drawings shall be interpreted as illustrative and not in a limiting sense.

What is claimed is:

1. In combination; an elevator car adapted to serve a plurality of landings; a hoisting motor therefor; a source of current for said hoisting motor; a movable body; and means utilizing a change in the kinetic energy of said movable body for controlling the distance from a landing at which a reduction in speed of the car takes place, said means comprising means controlled by the power applied to the hoisting motor for effecting said change in the kinetic energy of said body.

2. In combination; an elevator car adapted to serve a plurality of landings; a hoisting motor therefor; a source of current for said hoisting motor; means operable to reduce the speed of the car; means having a movable body and including means responsive to a change in the kinetic energy of said body from one value to another for controlling the distance of the car from a landing at which the operation of said speed reducing means takes place; and means for causing said change in kinetic energy of said body in accordance with the current supplied to the hoisting motor.

3. In combination; an elevator car adapted to serve a plurality of landings; a hoisting motor therefor; a source of current for said hoisting motor; means operable to reduce the speed of the car; means having a movable body and including means responsive to a change in the kinetic energy of said body from one value to another for controlling the distance of the car from a landing at which the operation of said speed reducing means takes place; and means for causing said change in kinetic energy of said body at a rate controlled in accordance with the power applied to the hoisting motor.

4. In combination; an elevator car adapted to serve a plurality of landings; a hoisting motor therefor; a source of current for the hoisting motor; an auxiliary motor having windings adapted upon being energized to effect a change of kinetic energy of the rotor of the motor; means operable upon the arrival of the car at a predetermined distance from a landing at which a stop is to be made for causing energization of said windings to effect a change in the kinetic energy of said rotor to a certain value, said windings acting, upon being thus energized, to cause said change of kinetic energy to said certain value to take place in a period of time which varies in accordance with the power being applied to the hoisting motor; and means operable upon the kinetic energy of said rotor reaching said certain value for causing a reduction in speed of the elevator car to take place.

5. In combination; an elevator car adapted to serve a plurality of landings; a hoisting motor therefor; a source of current for the hoisting motor; an auxiliary motor; means for causing operation of said auxiliary motor; means operable upon the arrival of the car at a certain distance from a landing at which a stop is to be made to cause said auxiliary motor to slow down and reverse in a period of time which is proportional to the current supplied to the hoisting motor; and circuit controlling means operable by said reversal of said auxiliary motor to cause a reduction in speed of the car to take place.

6. A control system for an elevator car comprising; a hoisting motor; a source of current for said motor; an electrically released, spring applied brake for said motor; means operable to cause the brake to be released and the motor connected to said source to start the car; and means for automatically stopping the car at a desired landing, said last named means comprising a small motor, means controlled by car movement for energizing said small motor at a fixed distance from said landing so as to cause it to accelerate in a given direction, means controlled in accordance with car movement for plugging said small motor at a fixed distance nearer said landing so as to bring it to rest and reverse it, and means operable when said small motor reverses for disconnecting said hoisting motor from said source and for applying said brake.

7. A control system for an elevator car comprising; a hoisting motor; a source of current for said motor; an electrically released, spring applied brake for said motor; means operable to cause the brake to be released and the motor connected to said source to start the car in the up direction; and means for automatically stopping the car at a desired landing, said last named means comprising a small motor, means controlled by car movement for energizing said small motor at a fixed distance from said landing to accelerate it in a given direction in proportion to the load being carried by the car, means controlled in accordance with car movement for plugging said small motor at a fixed distance nearer said landing so as to bring it to rest and reverse it in a distance of car travel which is proportional to the load being carried by the car, and means operable, when said small motor reverses, for disconnecting said hoisting motor from said source and applying said brake, whereby the car is brought to an accurate stop at said landing.

8. In combination; an elevator car adapted to serve a plurality of landings; a hoisting motor therefor; a source of current for said hoisting motor; circuit controlling means operable to cause a reduction in speed of the elevator car to take place; means having a movable body and utilizing the inertia thereof for controlling the operation of said circuit controlling means; and means responsive to the current supplied to the hoisting motor and the voltage applied thereto and rendered effective as the car approaches a landing at which a stop is to be made for controlling the movement of said movable body in such manner as to cause operation of said circuit controlling means to take place with the car at a distance from the landing which varies inversely as the power being applied to the hoisting motor.

9. In combination; an elevator car adapted to serve a plurality of landings; a hoisting motor therefor; a source of current for the hoisting motor; an additional motor having two windings; means for connecting said windings so that one of them is subject to the current supplied to the hoisting motor and the other subject to the voltage applied thereto to cause said additional motor to be rotating in a certain direction upon arrival of the car at a certain fixed distance from a landing at which a stop is to be made; additional means operable upon the arrival of the car at said fixed distance from said landing to cause said additional motor to be slowed down to a zero speed and reversed in a length of time which is proportional to the net load on the hoisting motor; and means responsive to the reversal of said additional motor to cause a reduction in speed of said hoisting motor to be initiated.

10. In combination; an elevator car adapted to serve a plurality of landings; a hoisting motor therefor; a source of current for the hoisting motor; an additional motor having two windings, one for connection so as to be subject to the current supplied to the hoisting motor and the other for connection so as to be subject to the voltage applied to the hoisting motor; means for causing said windings of said additional motor to be thus connected so as to cause the motor to be rotating in a certain direction upon arrival of the car at a certain fixed distance from a landing at which a stop is to be made; additional means operable upon the arrival of the car at said fixed distance from said landing to cause said windings to slow down said additional motor to a zero speed and reverse it in a length of time which is proportional to the net load on the hoisting motor; and means responsive to the reversal of said additional motor to cause a reduction in speed of said hoisting motor to be initiated.

11. In combination; an elevator car adapted to serve a plurality of landings; a hoisting motor therefor; a source of current for the hoisting motor; an additional motor having two windings, one adapted to be connected to said source in circuit with said hoisting motor so as to be subject to the current supplied to the hoisting motor and the other adapted for connection to said source so as to be subject to the voltage applied to the hoisting motor; means for causing said windings of said additional motor to be thus connected to said source so as to cause the motor to be operating in a certain direction upon arrival of the car at a certain fixed distance from a landing at which a stop is to be made; additional means operable upon the arrival of the car at said fixed distance from said landing to cause said windings of said additional motor to slow it down to a zero speed and reverse it in a length of time after the arrival of the car at said fixed distance from the landing such as to effect reversal thereof with the car at a distance from said landing which varies inversely as the net load on the hoisting motor; and means responsive to the reversal of said additional motor to cause a reduction in speed of said hoisting motor to be initiated.

12. In combination; an elevator car adapted to serve a plurality of landings; a hoisting motor therefor; a source of current for the hoisting motor; an additional motor having two windings, one connected so that the current supplied thereto is in accordance with the current supplied to the hoisting motor and the other adapted for connection to said source; circuit controlling means operated by said additional motor upon rotative movement thereof in one direction; means responsive to the operation of said circuit controlling means to cause the car to be slowed down; means operable upon the arrival of the car at a fixed distance from a landing at which a stop is to be made to connect said other winding of said additional motor to said source in such manner as to cause operation thereof in a direction opposite to that for effecting the operation of the circuit controlling means; and additional means operable before said additional motor attains a predetermined speed and upon the arrival of the car at a less fixed distance from the landing to alter the connections of said additional motor so as to cause it to slow down to a zero speed and reverse, thereby effecting operation of said circuit controlling means to initiate the operation of said slow down means, said windings of said additional motor acting to slow down and reverse the motor in such time after the arrival of the car at the second fixed distance from the landing as to cause operation of said slow down means to be initiated at a distance from said landing which varies inversely as the net load on the hoisting motor.

13. In combination; an elevator car adapted to serve a plurality of landings; a hoisting motor therefor; a source of current for the hoisting motor; an additional motor having two windings, one connected so that the current supplied thereto is in accordance with the current supplied to the hoisting motor and the other adapted for connection to said source; circuit controlling means operated by said additional motor upon rotative movement thereof in one direction; means responsive to the operation of said circuit controlling means to cause the car to be slowed down and finally brought to a stop; means operable upon the arrival of the car at a fixed distance from a landing at which a stop is to be made to connect said other winding of said additional motor to said source in such manner as to cause operation thereof in a direction opposite to that for effecting the operation of tthe circuit controlling means; and additional means operable before said additional motor attains a predetermined speed and upon the arrival of the car at a less fixed distance from the landing to alter the connections of said additional motor so as to cause it to slow down to a zero speed and reverse, thereby effecting operation of said circuit controlling means to initiate the operation of said slow down and stopping means, said windings of said additional motor acting to slow down and reverse the motor in such time after the arrival of the car at the second fixed distance from the landing as to permit said slow down and stopping to bring the car to an accurate stop at the landing, regardless of the net load on the hoisting motor.

14. In combination; an elevator car adapted to serve a plurality of landings; an alternating current hoisting motor for the car; a source of alternating current for said motor; means for slowing down the car; a two phase motor having one of its phase windings connected in series with one phase winding of the hoisting motor and the other adapted for connection to said source; circuit controlling means operated upon rotative movement of said two phase motor in one direction to cause operation of said slow down means; means operable upon the arrival of the car at a fixed distance from a landing at which a stop is to be made to connect said other phase winding of said two phase motor to said source in such manner as to cause operation thereof in a direction opposite to that for effecting the operation of the circuit controlling means; additional means operable before said two phase motor attains a predetermined speed and upon the arrival of the car at a less fixed distance from the landing to change the connections of said other phase winding of said two phase motor so as to cause it to slow down to a zero speed and reverse and thereby effect operation of said circuit controlling means to cause operation of said slow down means; and means for causing the kinetic energy developed by said two phase motor during its acceleration to be greater, the greater the net load on the hoisting motor and for causing said two phase motor to be slowed down and reversed to effect operation of said circuit controlling means in such time after the arrival of the car at the second fixed distance from the landing as to cause the car to make an accurate stop at the landing, regardless of the net load on the hoisting motor.

15. In combination; an elevator car adapted to serve a plurality of landings; a polyphase induction motor for raising and lowering the car; a source of polyphase alternating current for said motor; an electro-mechanical brake for the hoisting motor; switching means adapted, upon operation, to connect the hoisting motor to said source and to effect the release of said brake to start the car in operation in a given direction and, upon dropping out, to disconnect the hoisting motor from said source and to effect the application of said brake to slow down the car and finally bring it to rest; a compensator device provided with contacts for controlling the dropping out of said switching means; a two phase motor for operating said device, one of the phase windings of said operating motor being connected in series with one phase winding of the hoisting motor and the other being adapted for connection to said source, said device including clutch mechanism operated by said motor for causing operation of said contacts to effect the dropping out of said switching means only when the motor is operated in a certain direction; means actuated in accordance with car movement and operable, upon the arrival of the car at a fixed distance from a landing at which a stop is to be made, to connect said other phase winding of the operating motor to said source in such manner as to cause operation of said operating motor in a direction opposite to that for effecting the operation of the circuit controlling contacts; additional means actuated in accordance with car movement and operable while said operating motor is still accelerating and upon the arrival of the car at a less fixed distance from the landing to change the connections of said other phase winding of the operating motor so as to cause said operating motor to slow down to a zero speed and finally reverse to effect operation of said contacts to cause slow down of the car to be initiated; and impedance means associated with said other phase winding of the operating motor for causing the torque developed by said